US012597883B1

(12) United States Patent
    Xiong

(10) Patent No.: US 12,597,883 B1
(45) Date of Patent: Apr. 7, 2026

(54) PHOTOVOLTAIC TRACKING SYSTEM ON ROOFS

(71) Applicant: Qiyuan Xiong, North Bethesda, MD (US)

(72) Inventor: Qiyuan Xiong, North Bethesda, MD (US)

( * ) Notice: Subject to any disclaimer, the term of this patent is extended or adjusted under 35 U.S.C. 154(b) by 0 days.

(21) Appl. No.: 18/909,817

(22) Filed: Oct. 8, 2024

(51) Int. Cl.
    *H02S 20/32* (2014.01)
    *G05D 3/10* (2006.01)
    *G01S 3/786* (2006.01)

(52) U.S. Cl.
    CPC ............. *H02S 20/32* (2014.12); *G05D 3/105* (2013.01); *G01S 3/7861* (2013.01)

(58) Field of Classification Search
    CPC ........ H02S 20/32; G05D 3/105; G01S 3/7861
    See application file for complete search history.

(56) References Cited

U.S. PATENT DOCUMENTS

| | | | | |
|---|---|---|---|---|
| 4,620,771 | A * | 11/1986 | Dominguez .......... | G01S 3/7861 136/246 |
| 11,588,425 | B1 * | 2/2023 | Blair .................... | G02B 7/1821 |
| 2008/0040990 | A1 * | 2/2008 | Vendig .................. | F24S 30/452 52/173.3 |
| 2022/0115981 | A1 * | 4/2022 | Krarti ...................... | H02S 20/30 |
| 2023/0268868 | A1 * | 8/2023 | Li ........................... | H02S 20/30 136/246 |
| 2023/0402959 | A1 * | 12/2023 | Troncoso ................ | H02S 20/30 |

* cited by examiner

*Primary Examiner* — Jayne L Mershon

(57) ABSTRACT

A photovoltaic tracking system on roof, includes a photovoltaic panel group having photovoltaic panels connected together by their sides in a linear direction using connecting frames, a tilting system, a gear rack, and a stepper motor. The tilting system includes a rod, a wheel, and a rail. The rod has a first end connected to the wheel and a second end connected to the photovoltaic group. The wheel is disposed on the rail and configured to move linearly along the rail. The tiling system is configured to tilt the photovoltaic panel group by a push or pull force from the rod when the wheel travels on the rail. A triangle is formed by the titling system, the photovoltaic panel group, and a portion of the roof, when the tilting system tilts the photovoltaic panel group. The stepper motor moves the gear rack, so it moves the wheel.

11 Claims, 7 Drawing Sheets

PHOTOVOLTAIC TRACKING SYSTEM ON ROOFS

BACKGROUND OF THE INVENTION

This application is related to the automatic tracking system of photovoltaic panels on roofs, which is designed to track the sun's location and to max out the efficiency of the photovoltaic panels.

Photovoltaic panels have been mounted on roofs in a fixed direction in the past, and the efficiency for such photovoltaic panels is low. To increase the efficiency of the photovoltaic panels, photovoltaic tracking systems have been modified to position the photovoltaic panels to track the movement of the sun, and a few of those photovoltaic tracking systems are designed to be mounted on a roof. The main issues for these designs are usually their complexity, weight, maintenance issue, cost, and mounting difficulty. For example, U.S. Pat. No. 8,100,122 B2 discloses a double-axis photovoltaic tracking system designed for roofs. Its design makes the mounting very difficult, as it pairs each single photovoltaic panel with an individual, complex steering system, which also means high cost and heavy weight, and is also difficult to mount. Its design also lowers the total energy output due to the fact that fewer photovoltaic panels on a roof can be used as its individual steering system takes much space. Another example is illustrated in U.S. Pat. No. 8,481,906 B2. This photovoltaic single axis tracking system is specialized for peaks of roofs. Therefore, it only allows a small amount of photovoltaic panels to be mounted, so the total power output is low. Moreover, it requires much maintenance, as the peaks of roofs have small area, and the peak is pointy, making it hard to mount.

SUMMARY OF INVENTION

The Improved Photovoltaic Tracking System for roofs includes a single-axis tracking apparatus designed to enhance the efficiency of photovoltaic panels through tilting. This disclosed system is adapted for installation on rooftops and other inclined surfaces, thereby optimizing the capture of solar energy and improving overall performance.

A photovoltaic panel group is included in the invention to make installation with higher efficiency. In some embodiments, the photovoltaic panel group includes two or more photovoltaic panels connected by their sides, and they can be tilted together to track the sun. Each photovoltaic panel group includes its own control chip and light sensor. The light sensor is configured to measure the intensity of the light, and sends this measurement to the chip, which is configured to compare the intensity measurement with a previously-received light intensity measurement. Based on the comparison of these two measurements, the chip is configured to send a signal to a stepper motor to tilt the photovoltaic panel group in either direction to track the movement of the Sun. One end of the photovoltaic panel group is fixed on the roof by e.g., a joint. The rod is attached to the back of and supports the photovoltaic panel group. In some embodiments, more than one rod may be employed if there is a significant amount of photovoltaic panels in the photovoltaic panel group. In some embodiments, the photovoltaic panel group may provide power for the whole tracking system such that the system would not require external power, as the stepper motor, the light sensor, and the chip may use the power produced by the photovoltaic panel group.

The disclosed system uses a minimal number of components to achieve panel tilting. This design approach allows the system to add minimal weight to the roof structure and to occupy minimal space, thereby enabling the mounting of additional photovoltaic panels and increasing the total power output of the system. Furthermore, the system's cost-effective nature renders it a practical solution for residential applications.

The disclosed system has configurability for various roof types. By adjusting the mounting positions and lengths of certain components, the system can be adapted to accommodate different roof pitches and orientations. This configurability permits installation of the disclosed system to be on roofs with any orientation. In some embodiments, for east- or west-facing roofs, the system adjusts the tilt of the photovoltaic panel groups to track the sun's daily path, from its low elevation in the morning, to its zenith at midday, and back to its low elevation in the evening. For north- or south-facing roofs, the system adjusts to follow the seasonal variations in the sun's path, accommodating the more vertical trajectory during summer and the lower trajectory during winter. This adaptability addresses the limitation of fixed photovoltaic panels, which are restricted to specific roof orientations, thereby maximizing electricity production regardless of roof direction.

This disclosure provides a photovoltaic tracking system that can be disposed on a roof of a building. The photovoltaic tracking system includes a photovoltaic panel group; a tilting system, a gear rack, and a stepper motor. The tilting system includes a rod, a wheel, and a rail. The rod has a first end connected to the wheel and a second end connected to the photovoltaic group. The wheel is disposed on the rail and configured to move linearly along the rail, and the tiling system is configured to tilt the photovoltaic panel group by a push or pull force from the rod when the wheel travels on the rail. A triangle is formed by the titling system, the photovoltaic panel group, and a portion of the roof, and a shape of the triangle changes when the tilting system tilts the photovoltaic panel group. The gear rack is disposed on the roof and configured to move the wheel. The stepper motor is connected to and configured to move the gear rack to push the wheel.

In some embodiments, the photovoltaic panel group includes a plurality of photovoltaic panels, where each of the photovoltaic panels are connected to each other by their sides.

In some embodiments, the photovoltaic tracking system further includes a chip configured to control the tilting system to tilt the photovoltaic panel group.

In some embodiments, the photovoltaic tracking system further includes a light sensor disposed adjacent to the photovoltaic panel group and configured to measure light intensity of an environment of the photovoltaic panel group. The chip is electronically connected with the light sensor and the stepper motor, configured to receive light intensity information from the light sensor and output a control signal to the stepper motor to control the stepper motor to tilt the photovoltaic panel group.

In some embodiments, the photovoltaic tracking system includes a plurality of photovoltaic panel groups including the photovoltaic panel group. Each of the photovoltaic panel groups has its own chip and light sensor.

In some embodiments, an axle of the wheel at the first end of the rod is extended to fit in the rail.

In some embodiments, an axle of the wheel at the first end of the rod is connected directly to the gear rack by a connecting piece so that a lateral movement of the gear rack induces a rolling movement of the wheel at the first end of the rod.

In some embodiments, a gear befitting the gear rack is attached to a rotor of the stepper motor.

In some embodiments, the photovoltaic tracking system further includes supporting bumps attached on the roof to support the gear rack.

In some embodiments, a first end of the photovoltaic panel group is mounted on the roof, and a second end of the photovoltaic panel group is movable as the photovoltaic panel group is tilting.

In some embodiments, the photovoltaic tracking system is powered by the photovoltaic panel group.

In some embodiments, the gear rack is disposed in parallel to the rail.

In some embodiments, the gear rack overlaps with the rail as the photovoltaic panel group is tilting, and does not extend beyond an end of the rail.

In some instances, the disclosed system further includes a tilting system comprising a rod, a wheel, and a rail. The rod has two ends, with a first end attached to the said wheel and with a second end attached to the back of the photovoltaic panel group. The wheel, which is attached to the first end of the rod, is configured to be able to roll on the roof or on a track if the roof is not flat. As the said wheel moves, the photovoltaic panel tilts, experiencing either a push or a pull force from the rod as well as the wheel on its first end. The rail is rectangular, and it has a rectangular shape hollowed out from its side. The axle of the wheel extends to fit in the rectangular shape hollowed out from the rail. The rail lays on both sides of the wheel, and it is parallel to the movement of the wheel. The rail confines the movement of the wheel to a unidirectional front-and-back path, preventing vertical displacement. This rail configuration is designed to mitigate the effects of strong wind forces, which could otherwise cause abnormal tilting of the photovoltaic panels. The design forms a stable triangular configuration consisting of the rod with the wheel, the photovoltaic panel group, and the roof, thereby enabling the system to support significant weight.

In some implementations, a gear rack and a stepper motor are also included in the design to provide force for the tilting of the photovoltaic panel group. The gear rack is disposed on the roof supported by small supporting structures to hold it up. The gear rack may be disposed in a parallel orientation with the rail, and the gear rack will also be disposed between the rail. One end of the gear rack is connected to the axle of the wheel on the first end of the rod by a connecting piece. This connecting piece is configured in such a way that the movement of the gear rack, which is going to be parallel with the movement of the wheel, will transfer directly to the movement of the wheel, as it applies either a push or pull force to the wheel. The movement of the gear rack may be provided by a stepper motor, which may be disposed on the roof with rigid attachment. A gear befitting the gear rack may be attached to the rotor of this stepper motor. Therefore, the rotational movement of the rotor of the gear exerts a force on the gear rack, thereby moving the gear rack in two directions. The moving of the gear rack may then transfer to the movement of the said wheel, which then tilts the photovoltaic panel group by changing the position of the rod. As the gear rack is moving, it may overlap with the rail from a side view. However, the gear rack will not extend beyond the end of the rail.

DETAILED DESCRIPTION OF THE EMBODIMENTS

Figure 1:
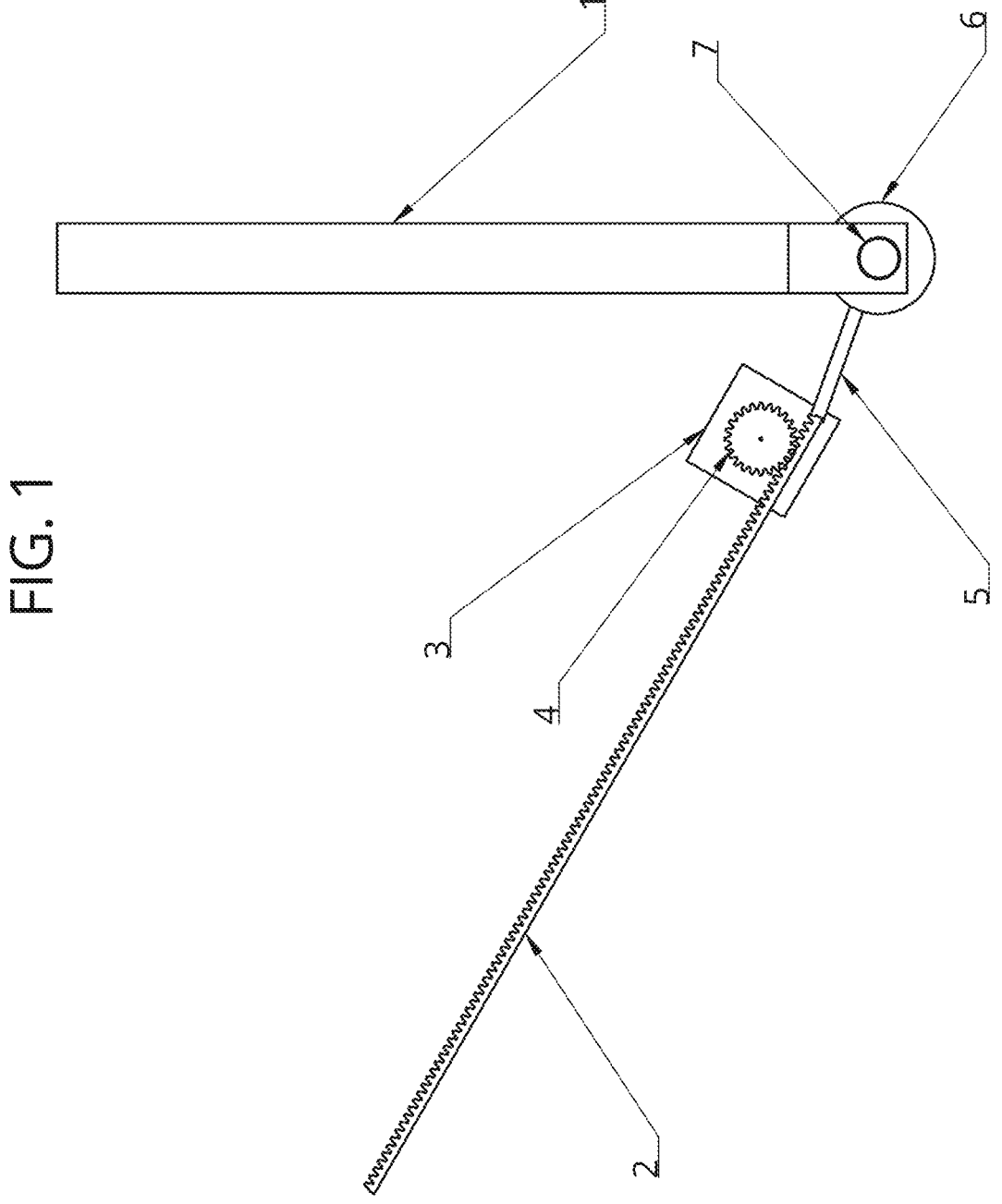
FIG. 1 shows a side view of a photovoltaic tracking system consistent with embodiments of this invention.
Figure 2:
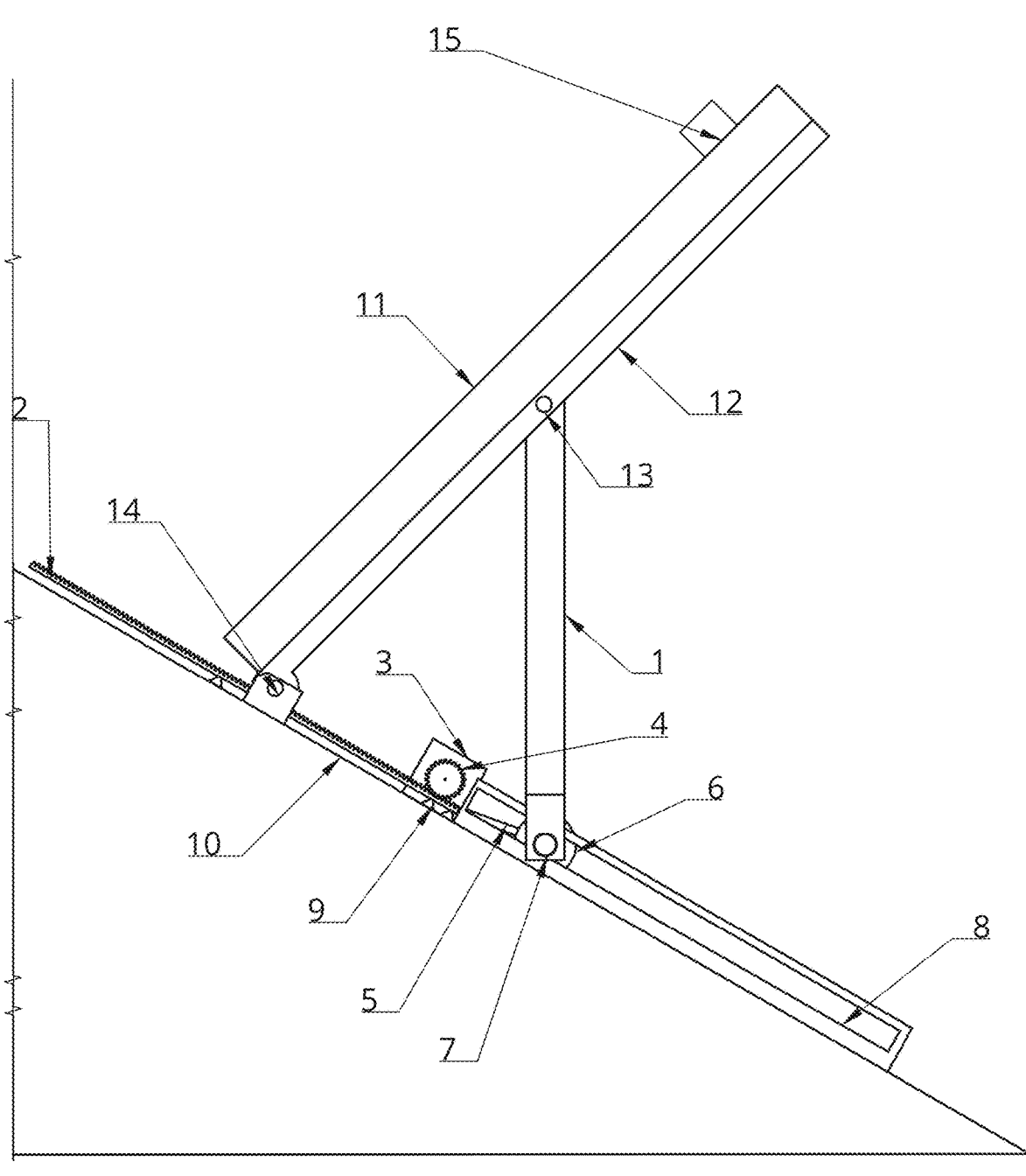
FIG. 2 is another side view of a photovoltaic tracking system consistent with embodiments of this invention.

The description below is intended by way of example only. Various modifications and structural changes may be made therein without departing from the scope of the concepts described herein and within the scope and range of equivalents of the claims. As shown in FIG. 1, rotational movement from the stepper motor 3, is transferred to the metallic gear rack 2 via the metallic gear 4 connected to the stepper motor 3. This rotational motion causes the gear rack 2 to move linearly. The gear rack 2 is connected to the metal connecting piece 5. This connection results in the movement of the metallic or plastic wheel 6 at the first end of the rod 1, pushing it forward. Consequently, this movement tilts the photovoltaic panel group 11. The wheel 6, located at the first end of the rod 1, has an extended axle 7 and is restricted to linear movement as shown in FIG. 2. The rod 1, with the wheel 6 attached at one end, uses ball bearings or similar joints to connect to the wheel 6.

Figure 3:
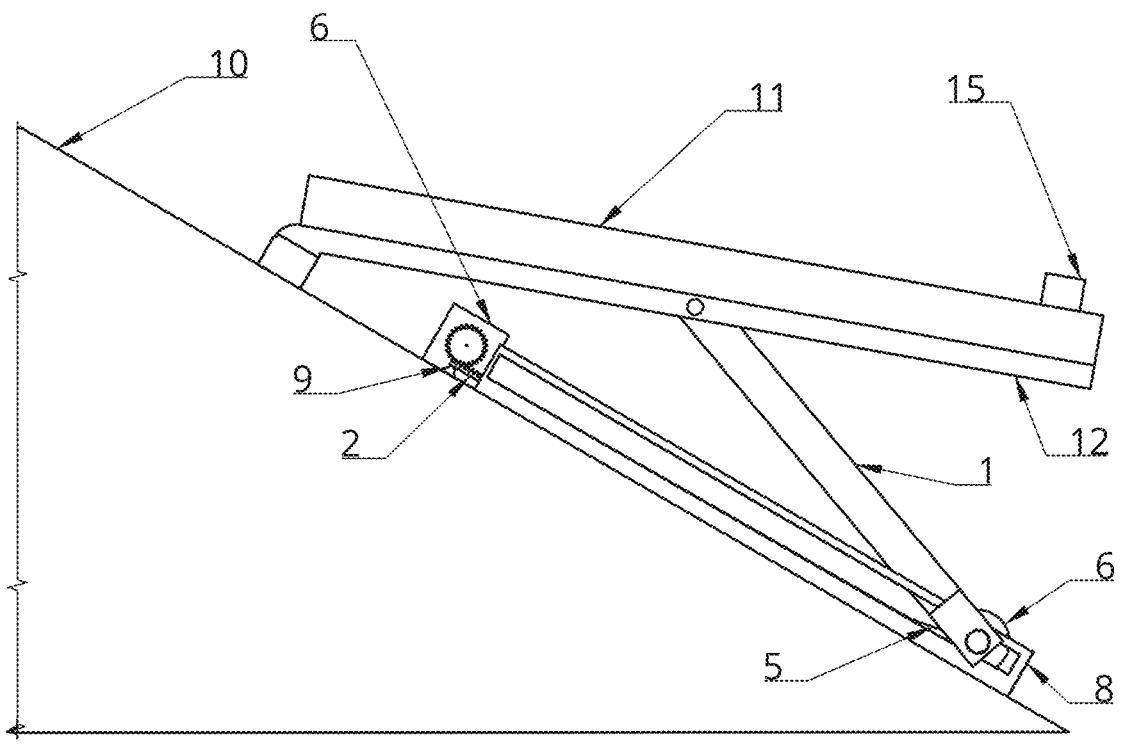
FIG. 3 is another side view of a photovoltaic tracking system consistent with embodiments of this invention.

FIGS. 2 and 3 illustrate the installation of the disclosed system on roofs oriented east or west. The lengths for components such as the rod 1 with its wheel 6 and the gear rack 2 are configured to optimize both maximum and minimum tilt angles for the photovoltaic tracking system. The configuration changes to adapt to roofs with different factors such as pitch angles. This specific installation for east and west facing roofs may involve the same length of components, as the sun's trajectory is consistent throughout the day. The photovoltaic panel group 11, which is composed of, for example, medium-sized photovoltaic panels for optimal weight, is attached to the supporting structure 12 using, e.g. screws. The supporting structure 12 is mounted to the roof 10 via a metal joint 14, which is secured with screws. This joint 14 is where one end of the photovoltaic panel group 11 is fixed on the roof 10. The supporting structure 12 is connected to rod 1 at its first end through rotatable joint 13. In some embodiments, a light sensor 15, attached to the edge of the photovoltaic panel group 11, measures light intensity of an environment of the photovoltaic panel group 11. The light sensor 15 may be disposed on other places as long as it is adjacent to the photovoltaic panel group 11. Underneath the photovoltaic panel group 11, the stepper motor 3 drives the gear rack 2 using the gear 4 on its rotor. The stepper motor 3 is also fixed to the roof 10 using, e.g., screws. The gear rack 2 is elevated by plastic or metallic supporting bumps 9, which minimize friction and maintenance costs, and these bumps are mounted to the roof with, e.g., screws. As the stepper motor 3 rotates, its rotational movement is transformed to the linear movement of the gear rack 2, which pushes the metallic connecting piece 5. The connecting piece 5 is attached to the extended axle 7 of the wheel 6 on the first end of the rod 1 by, e.g., ball bearing, and connecting piece 5 allows the movement of the gear rack 2 to move the wheel 6 on the first end of the rod 1. This movement adjusts the tilt of the photovoltaic panel group 11 because joint 13 allows only rotational movement of rod 1 having a first end of the wheel 6. The structure forms a stable triangular configuration involving the photovoltaic panel group 11, the rod 1 having a first end connected to the wheel 6, and the roof 10, enhancing stability and weight capacity. The movement of the wheel 6 is guided by the metallic rail 8, which is mounted to the roof with, e.g., screws. The rail 8 features a rectangular cutout to accommodate the extended axle 7. Therefore, rail 8 improves wind resistance by stabilizing the photovoltaic panel group 11 on two axes, limiting the vertical displacement as well as the crooked path of the wheel 2, while the high-torque stepper motor 3 mitigates movement along the third axis, the axis which the wheel rolls. The gear rack 2 may be moved through the joint 14 to minimize the space for the installation. As the gear rack 2 pushes the wheel 6 to move downward on the roof 10, the gear rack 2 is moved into and overlaps with the rail 8. In some embodiments, the end of the gear rack 2 connected to the wheel 6 is controlled not to move beyond the lower end of the rail 8.

Figure 4:
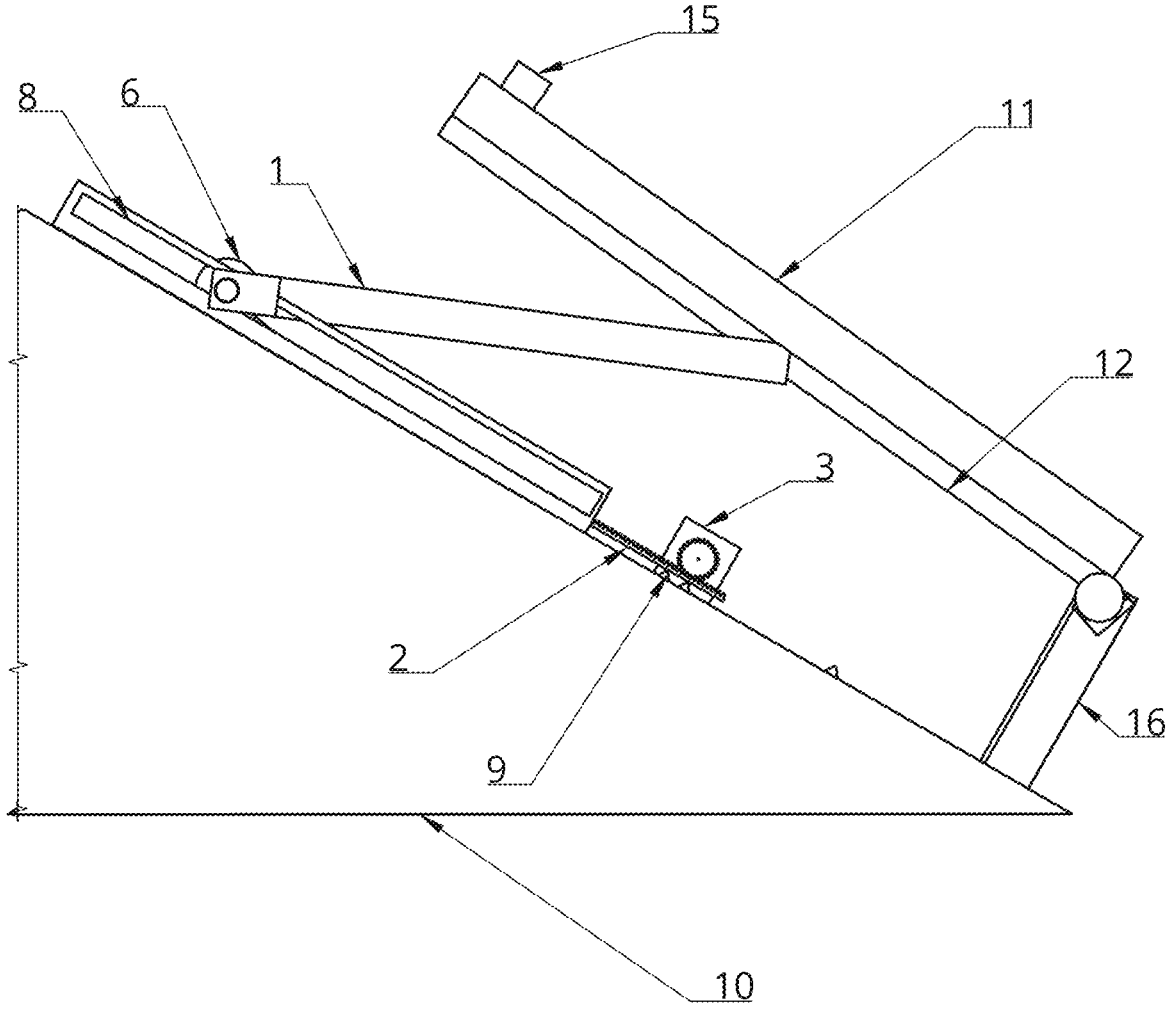
FIG. 4 is a side view of a photovoltaic tracking system consistent with embodiments of this invention.

FIG. 4 shows that the system can be adapted for roofs facing north or south by adjusting the length of the rod 1, the gear rack 2, and the rail 8, along with rotating the entire assembly by 180 degrees. For south-facing roofs, a metallic supporting column 16 may be used to achieve the necessary tilt to track the sun's angle throughout the seasons. To install this system for the north-facing roofs, the system may be modified in a different configuration and a different orientation.

Figure 5:
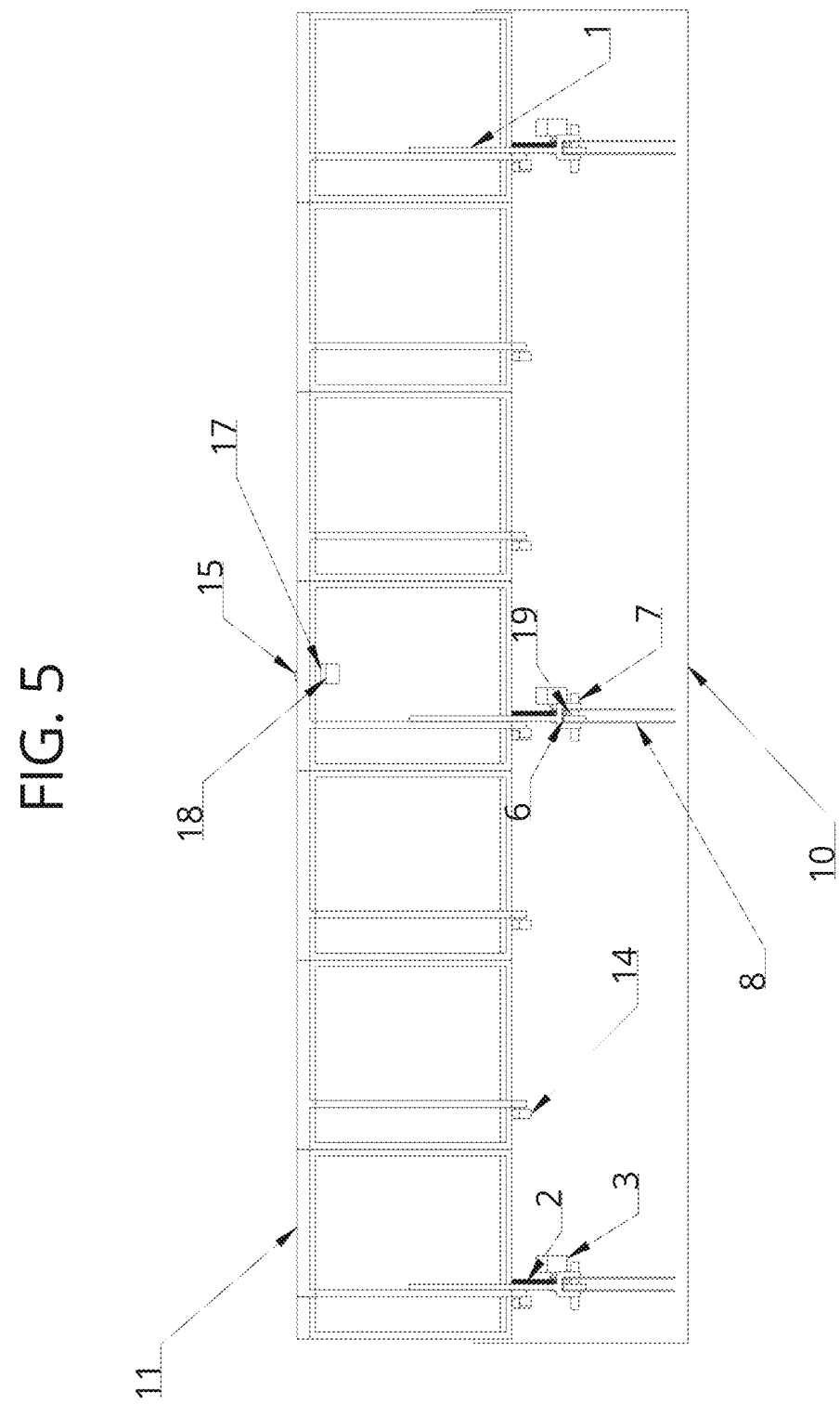
FIG. 5 is a top view of a photovoltaic tracking system installed on a rooftop, consistent with embodiments of this invention.

FIG. 5 depicts the connection of the light sensor 15 to the circuit box 18, located beneath the photovoltaic panel group 11. The circuit box 18 contains a chip 17 that processes data from the light sensor 15. Based on this data, the chip 17 sends signals to the stepper motors 3 to adjust the tilt of the photovoltaic panel group 11. The light sensor 15 is configured to constantly take measurement of light intensity and sends the measurement to chip 17 in circuit box 18. The chip 17 is configured to constantly compare the measurement of the light intensity given by the light sensor 15. By comparing these measurements, the chip 17 determines an angle to tilt the photovoltaic panel group 11 to the direction with higher light intensity. Repeating this step, the photovoltaic panel group 11 may be tilted into a location where the sunlight is at its peak intensity at the moment. This figure illustrates an installation for east- or west-facing roofs, demonstrating the invention's cost efficiency and practicality.

Figure 6:
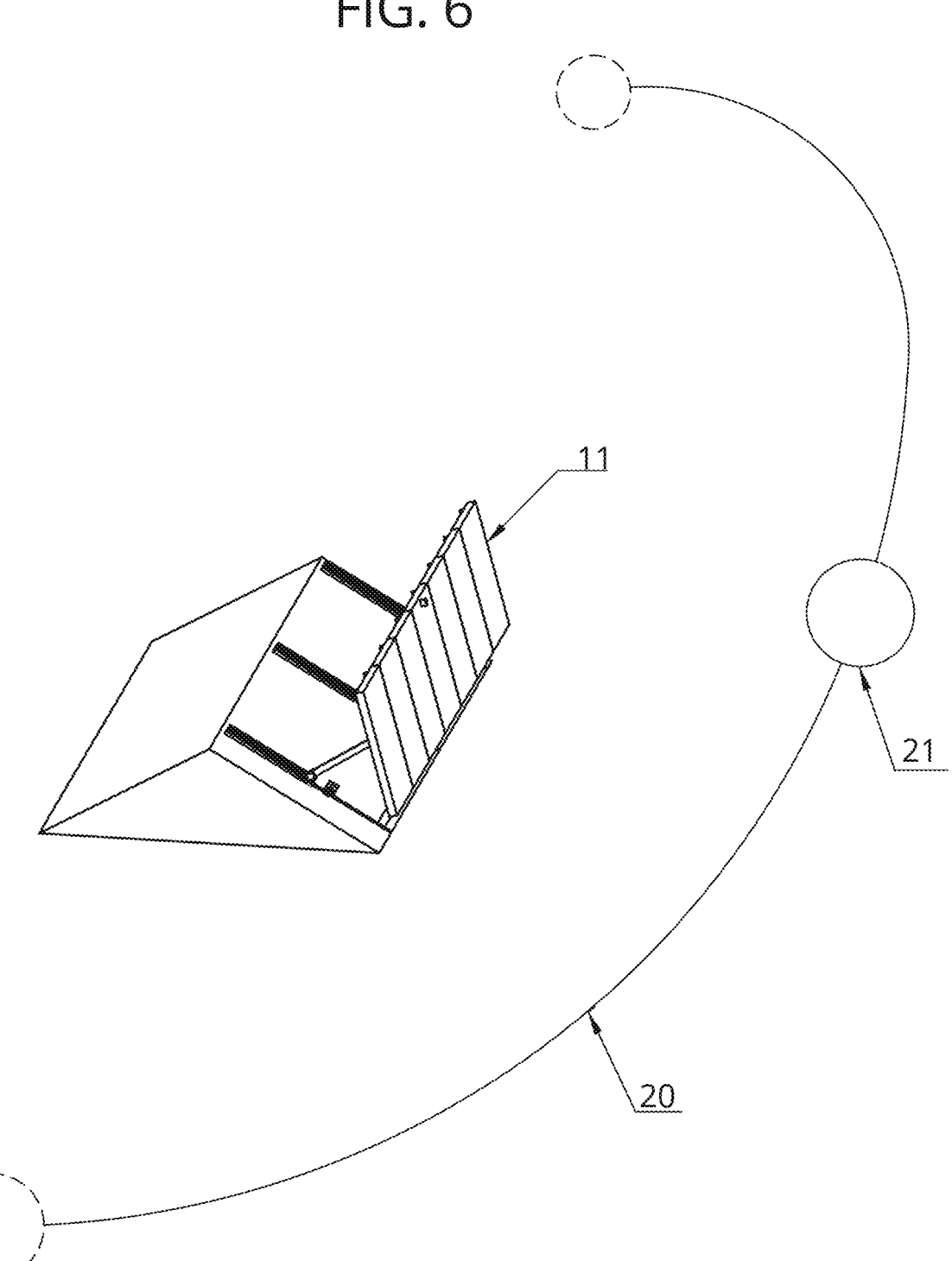
FIG. 6 is an elevated overview of a photovoltaic tracking system installed on a rooftop showing its tracking with the sun, consistent with embodiments of this invention.

Referencing to FIG. 6, an installation of the system mounted on a south facing roof is presented. The angle between the route of the sun 20 and ground is very small during winter, and thus the photovoltaic tracking system would tilt the photovoltaic panel group 11 more vertically, so that the photovoltaic panel group 11 would be more perpendicular to the sun's location at noon 21.

Figure 7:
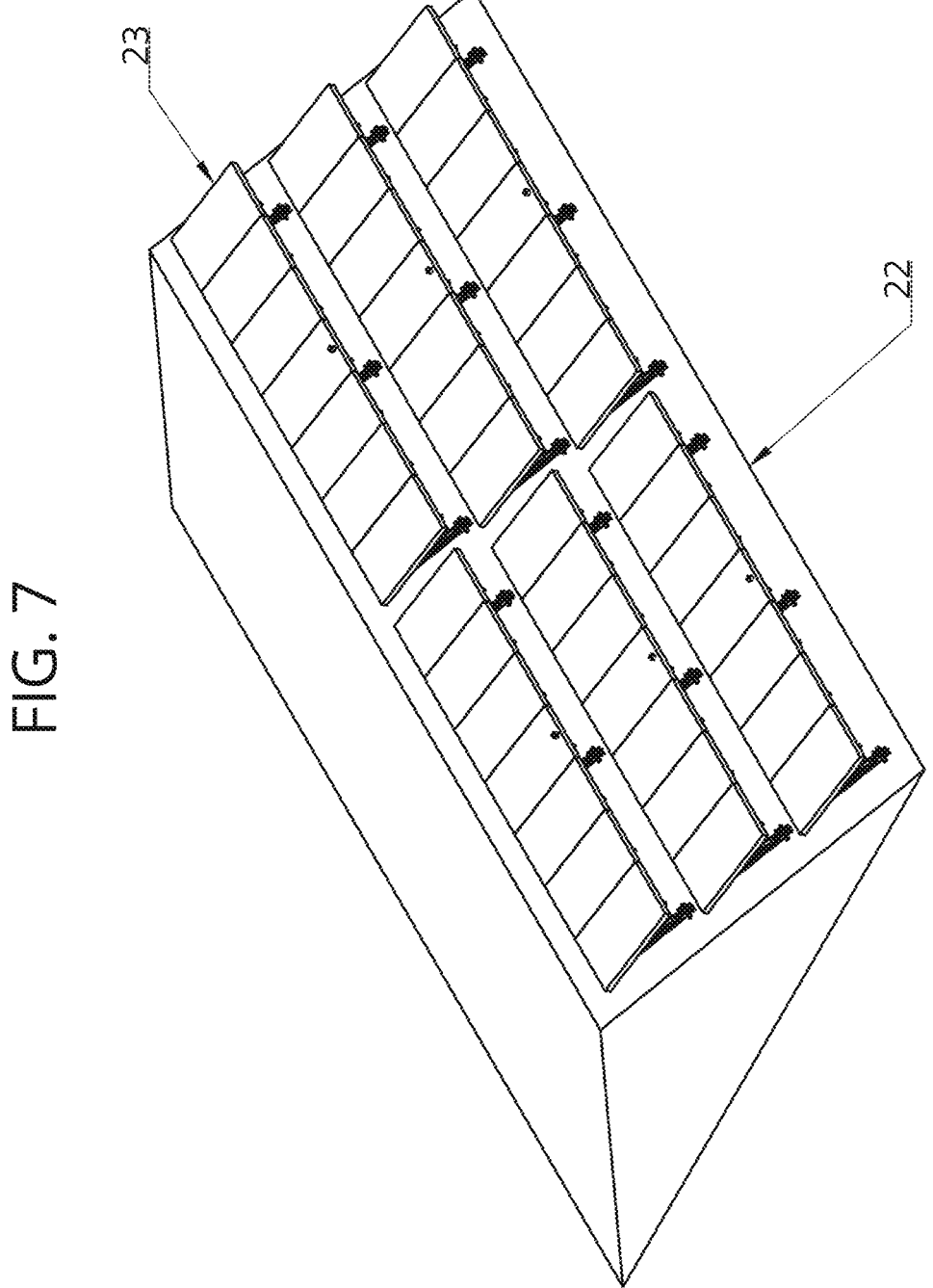
FIG. 7 is an overview of a photovoltaic tracking system installed on a rooftop consistent with embodiments of this invention.

FIG. 7 presents a real-life scale installation on a roof 22, accommodating multiple photovoltaic panel groups 23, each connected in a linear array with screws and supporting frames. Each group has its own light sensor 15 and circuit box 18 with its own chip 17 inside. This setup demonstrates the invention's space efficiency, as the total length required for the gear rack 2 and rail 8 is only slightly longer compared to the width of the photovoltaic panels groups 23. Consequently, the maximum number of photovoltaic panels that can be installed is comparable to fixed-angle installations.

I claim:

1. A photovoltaic tracking system disposed on a roof of a building, comprising:

a photovoltaic panel group;

a tilting system comprising a rod, a wheel, and a rail, wherein the rod has a first end connected to the wheel and a second end connected to the photovoltaic panel group; the wheel is disposed on the rail and configured to move linearly along the rail, and the tilting system is configured to tilt the photovoltaic panel group by a push or pull force from the rod when the wheel travels on the rail, wherein a triangle is formed by the the titling system, the photovoltaic panel group, and a portion of the roof, wherein a shape of the triangle changes when the tilting system tilts the photovoltaic panel group, a gear rack supported by mounting elements, including, but not limited to a supporting bump, connected to the said wheel by through coupling components including, but not limited to a connecting piece, wherein the gear rack is independent of the said rail, permitting an aligned movement into and out of the rail, which may facilitate a full range of motion for the said photovoltaic panel group;

a stepper motor connected to and configured to move the gear rack to push the wheel.

2. The photovoltaic tracking system of claim 1, wherein the photovoltaic panel group comprises a plurality of photovoltaic panels, wherein the photovoltaic panels are connected to each other by their sides.

3. The photovoltaic tracking system of claim 1, further comprising a chip configured to control the tilting system to tilt the photovoltaic panel group.

4. The photovoltaic tracking system of claim 3, further comprising a light sensor disposed adjacent to the photovoltaic panel group and configured to measure light intensity of an environment of the photovoltaic panel group, wherein the chip is electronically connected with the light sensor and the stepper motor, configured to receive light intensity information from the light sensor and output a control signal to the stepper motor to control the stepper motor to tilt the photovoltaic panel group.

5. The photovoltaic tracking system of claim 1, wherein the photovoltaic tracking system comprises a plurality of photovoltaic panel groups, wherein each of the photovoltaic panel groups has its own chip and light sensor.

6. The photovoltaic tracking system of claim 1, wherein an axle of the wheel at the first end of the rod is extended to fit in the rail.

7. The photovoltaic tracking system of claim 1, wherein an axle of the wheel at the first end of the rod is connected directly to the gear rack by a connecting piece so that a lateral movement of the gear rack induces a rolling movement of the wheel at the first end of the rod.

8. The photovoltaic tracking system of claim 1, wherein a gear befitting the gear rack is attached to the stepper motor.

9. The photovoltaic tracking system of claim 1, further comprising supporting bumps attached on the roof to support the gear rack.

10. The photovoltaic tracking system of claim 1, wherein a first end of the photovoltaic panel group is mounted on the roof, and a second end of the photovoltaic panel group is movable as the photovoltaic panel group is tilting.

11. The photovoltaic tracking system of claim 1, wherein the photovoltaic tracking system is powered by the photovoltaic panel group.

\* \* \* \* \*